(12) United States Patent
Darsy et al.

(10) Patent No.: US 8,710,744 B2
(45) Date of Patent: Apr. 29, 2014

(54) AUTOMOTIVE LIGHTING SYSTEM

(75) Inventors: Francois Darsy, Challet (FR); Jelle Peter Pelsma, Chartres (FR); Timothy Xuejun Zhang, Shanghai (CN); Chao Ding, Shanghai (CN)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 13/695,997

(22) PCT Filed: Apr. 26, 2011

(86) PCT No.: PCT/IB2011/051807
§ 371 (c)(1),
(2), (4) Date: Nov. 2, 2012

(87) PCT Pub. No.: WO2011/138708
PCT Pub. Date: Nov. 10, 2011

(65) Prior Publication Data
US 2013/0057150 A1    Mar. 7, 2013

(30) Foreign Application Priority Data

May 7, 2010    (EP) .................................... 10305483

(51) Int. Cl.
| | | |
|---|---|---|
| *B60Q 1/02* | (2006.01) | |
| *B60Q 1/00* | (2006.01) | |
| *B60Q 11/00* | (2006.01) | |
| *B60L 1/14* | (2006.01) | |

(52) U.S. Cl.
CPC ............... *B60Q 1/00* (2013.01); *B60Q 1/0017* (2013.01); *B60Q 11/00* (2013.01); *B60Q 2400/30* (2013.01); *B60Q 2900/10* (2013.01); *B60L 1/14* (2013.01)
USPC .................. 315/82; 315/77; 315/83; 315/149

(58) Field of Classification Search
CPC ..................................... B60L 1/14; B60L 1/16
See application file for complete search history.

(56) References Cited

U.S. PATENT DOCUMENTS

| | | | |
|---|---|---|---|
| 5,555,454 A | 9/1996 | Dees | |
| 5,747,934 A | 5/1998 | Yamamoto | |
| 5,841,203 A | 11/1998 | Chambers | |
| 5,909,084 A | 6/1999 | Fu | |
| 6,195,001 B1 | 2/2001 | Haddad | |
| 6,879,248 B2 * | 4/2005 | Flick | ............. 340/435 |
| 2008/0316012 A1 | 12/2008 | Paasche | |
| 2010/0302024 A1 | 12/2010 | El Hadj | |
| 2013/0175925 A1 * | 7/2013 | Ding et al. | ............ 315/77 |

FOREIGN PATENT DOCUMENTS

| | | |
|---|---|---|
| DE | 10142358 A1 | 3/2003 |
| DE | 202004001296 U1 | 4/2004 |
| DE | 202006002061 U1 | 8/2006 |
| GB | 2411458 A | 8/2005 |

* cited by examiner

*Primary Examiner* — Anh Tran

(57) ABSTRACT

An automotive lighting system (20) is described with a signal emitting device (30) installed in a lamp socket (18). The lamp socket (18) is connected to a lighting connection (16) of a vehicle (10). The signal emitting device (30) emits a signal if the lighting connection (16) is energized. A lighting module (24) is connected to an electrical power supply (28) of the vehicle (10). The lighting module (24) comprises a receiver (42), a control unit (45) and a light source (22). The control unit (46) is disposed to operate the light source (22) in a first mode if a signal is received in the receiver, and in a second mode if the signal is not received.

12 Claims, 2 Drawing Sheets

AUTOMOTIVE LIGHTING SYSTEM

Invention relates to an automotive lighting system, a signal emitting device and a lighting module, both for use in an automotive lighting system, and to a method to installing a light source in a vehicle.

BACKGROUND OF THE INVENTION

In the present context, an automotive lighting system is understood to mean a system onboard a motor vehicle including an electrical circuit comprising electrical light sources and their electrical connections.

There are numerous electrical light sources on board of today's motor vehicles fulfilling defined lighting functions such as e. g. high beam, low beam, fog light etc. Additional to such lighting functions which have been used for many years, other functions such as a daytime running light (DRL) have recently been introduced. A light source fulfilling a DRL function should be turned on while the motor is running during the daytime, but should be turned off at night, i. e. if the low beam is activated.

While such functions may be easily realized in a newly manufactured automobile, retrofitting a vehicle with such a function requires an electrical connection of the light source used for the DRL lighting function not only with an electrical power supply, i. e. battery/electrical generator but also with a switch that ensures its correct function.

One possible way of retrofitting a vehicle with a light source with DRL lighting function is to connect it to the position light of the automobile. The position light is usually an electrical light source of very small electrical power that is activated together with the low beam lighting function. If the position light is on, the DRL light source must be turned off; if electrical power is present (i. e. the motor is running or at least the ignition is activated) and the position light is off, the DRL light source should be turned on. However, installing a DRL light source in this way requires an electrical connection to the position lamp wiring, and thus a modification to the original wiring of the automobile.

U.S. Pat. No. 5,909,084 describes a daytime running light adapter kit designed to be installed in a vehicle to allow the vehicle to be equipped with daytime running light. An electronic unit has a set of connectors to be connected to the vehicle light. The daytime running light adapter kit turns on the DRL lights only when the vehicle engine is operating and the manual front light switch is off.

SUMMARY OF THE INVENTION

It is an object of the present invention to provide an automotive lighting system and sub-assemblies thereof as well as a method for installing a light source in a vehicle that allow to easily install an additional light source fulfilling a lighting function in cooperation with the existing lighting system of the vehicle.

This object is solved according to the invention by the automotive lighting system according to claim 1, a signal emitting device for use in such a system according to claim 10, a lighting module for use in the system according to claim 12, and by a method according to claim 13. Dependent claims refer to preferred embodiments of the invention.

The present inventors have concluded that for retrofitting a DRL lighting function in an automobile a system and method should be available that do not require an intervention into the existing electrical wiring. The solution found provides an electrical connection to other lighting functions which may be installed without manipulation of the wiring, but instead uses a lamp socket connection. This central idea may advantageously be used e. g. for retrofitting a DRL lighting function, but could possibly also be used for installing light sources fulfilling other types of lighting functions.

The automotive lighting system according to the invention includes a signal emitting device and a lighting module to be installed in a vehicle.

The signal emitting device may be installed in a lamp socket of the vehicle, which is connected to its lighting connection, i. e. the internal electrical connection onboard the vehicle which connects the lamp socket to electrical power via the respective switch installed in the vehicle. The lamp socket is an electrical and mechanical socket intended to hold a lamp, which would usually be releasably installed in the lamp socket. Further preferred, the lamp socket is of a type such that a lamp (and, in its place in the present invention, the signal emitting device) may be both mechanically mounted and electrically connected without the use of tools, e. g. in a screw connection, bayonet connection or plug connection. The lamp socket disposed to receive a lamp is used for installing the signal emitting device, i. e. in the case of retrofitting a vehicle by replacing a lamp received in the lamp socket.

The signal emitting device operates by emitting a signal depending on electrical power supplied to the lighting connection of the lamp socket. In case different levels of electrical power may be supplied, the signal may vary accordingly, i. e. different types of signals may be emitted, differentiated, e. g. by different frequency or modulation. Thus, in dependence on the electrical power supply to the lighting connection at least a first type of signal is generated, but further types of signals may be generated for differently supplied electrical power. In the preferred case, where electrical power is supplied to the lamp socket either fully, i. e. at full board voltage, or not at all, a signal is emitted if the lighting connection of the lamp socket is energized, i. e. if electrical power is supplied to electrical contacts thereof. As will be apparent in connection with preferred embodiments, the emitted signal is preferably a wireless signal. Here, a radio signal is preferred over other wireless signals such as infrared or ultrasonic etc. In the alternative, the signal may be emitted to be distributed over a wire, e. g. as a modulated signal, which could be additional wiring connected to the signal emitting device or the lighting connection of the lamp socket. Preferably, the signal emitting device continously operates to emit the the signal as long as electrical power is supplied to the lamp socket and does not emit the signal as long as no power is supplied to the lamp socket.

The system further comprises a lighting module which may be connected to an electrical power supply of the vehicle which has a receiver disposed to receive the signal emitted by the signal emitting device. The lighting module may be connected to at least one light source for fulfilling a lighting function of the vehicle lighting system, which preferably is arranged in the front of the vehicle. As will be recognized by the skilled person, any type of electrical light source may be used suited for the intended lighting function, such as e. g. incandescent lamp, discharge lamp, LED or other.

The lighting module further has a control unit to operate the light source. According to the invention, the light source may be operated in at least two different modes, dependent on reception of a signal from the signal emitting device by the receiver. In case different types of signals may be emitted by the signal emitting device, operation in the first and second mode may be dependent on the type of signal received, i. e. the light source may be operated in the first mode if a first type of signal is received and in second mode a second type of signal is received (as well as, optionally, further different types of signals leading to operation in further different types of modes). In the preferred embodiment, where the signal emitting device only emits one type of signal, the light source is operated in a first mode if this signal is received, and in the second mode if no signal is received.

The two different modes of driving the light source are preferably distinguished by the time average luminous flux generated from the light source. It should be noted that in the present context turning off the light source is understood as a possible mode of operation, i. e. the first and second mode of operation may be distinguished by that in the first mode the light source is turned off, and in the second mode the light source is turned on. Generally, it is preferred to operate the light source in the second mode to emit a higher (time average) luminous flux than in the first mode, i. e. by operating the light source to emit light in the first mode in a dimmed manner as compared to operation in the second mode. In the case of an LED or an array of LEDs provided as the light source, different levels of luminous flux may be provided by operating the LEDs in a pulsed manner. In the first mode of lower luminous flux the LED light source is then driven with an accordingly low duty cycle (up to 0% if the light source should be off in the first mode), and in the second mode with higher luminous flux the LED light source may be driven with higher duty cycle (up to 100% for continuous operation).

The lighting system and method according to the invention thus makes it possible to install a light source to operate in controlled manner dependent on operation of other lighting functions of the vehicle, here dependent on the status of electrical activation of the lamp socket. By using the lamp socket as electrical (and also mechanical) interface, a reliable electrical connection is ensured without a manipulation to the original vehicle wiring. The system may thus easily be installed.

The signal emitting device proposed in a separate aspect of the invention has a releasable electrical connection for fitting in electrical contacts of the lamp socket. It is preferable operated by the electrical power supplied to the lamp socket. A voltage regulator may be provided for regulating the voltage from the electrical contacts to operate a signal emitter.

In a preferred embodiment of the invention, the automotive lighting system and method is used for providing a DRL lighting function. The signal emitting device is then preferably installed in a lamp socket of a position light of the vehicle. The light source (preferably two separate light sources) is arranged at the front of the vehicle as daytime running light. Further preferred, the light source is operated to emit a smaller luminous flux (dimmed operation) in the first mode, i. e. if electrical power is supplied to the lamp socket of the position light and a corresponding signal is received. The light source thus takes over the function of the position light (which preferably is entirely replaced by the signal emitting device, i. e. no light source is installed in the lamp socket). If no signal is received, i. e. no electrical power is supplied to the position light lamp socket, the light source is operated in a second mode of higher luminous flux to provide a DRL lighting function. Thus, it is ensured that the light source operates as a DRL lighting function only if the low beam of the vehicle is not activated.

According to a further preferred embodiment, the signal emitting device comprises a signal generator for generating a coded signal and the receiver comprises a decoder for decoding said coded signal. This is intended to ensure that the lighting function may not be unduly influenced, e. g. by noise signals or by signals from other signal emitting devices in range, e. g. if plural signal emitting devices are installed in the same vehicle or if another vehicle with installed signal emitting device is present nearby. In the present context, a coded signal is understood to mean a time-variant signal with modulated information encoded therein. Preferably, the information corresponds to a unique identifier, which may be provided e. g. as a digital value both in the signal generator of the signal emitting device and the decoder in the lighting module.

These and other aspects of the invention will be apparent from and elucidated with to the embodiment described hereinafter.

DETAILED DESCRIPTION OF THE EMBODIMENTS

Figure 1:
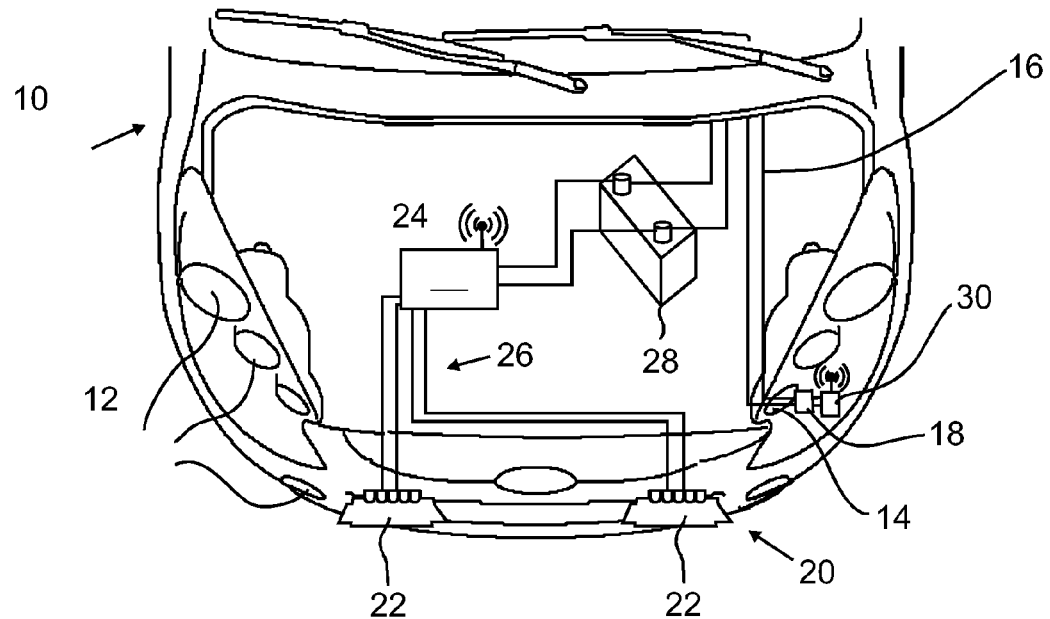
FIG. 1 shows a symbolical representation of the frontside of a vehicle with schematically shown connections and components of an embodiment of a lighting system.

FIG. 1 shows a part of a motor vehicle 10 equipped with a lighting system including headlamps 12 for standard lighting functions such as high beam, low beam, fog light, direction indicator etc. These lamps 12 form part of an OEM automotive lighting system of the vehicle 10, i. e. a system where all components, such as the headlights 12 including lamps installed in lamp socket with corresponding reflectors (not shown) as well as the electrical wiring, electrical switches etc. connected thereto (not shown) are pre-installed in the vehicle 10 at the time of manufacture. One part of the OEM automotive lighting system of the vehicle 10 shown is a position light 14 connected to the OEM automotive lighting system by electrical wiring 16. As symbolically shown in FIG. 1, the position light 14 includes a lamp socket 18.

As known to a person skilled in the art, the lamp socket 18 shown only symbolically in FIG. 1 may be one of several known standard types of lamp sockets, for which corresponding lamps are available to be easily mounted and thereby both mechanically fixed and electrically connected within lamp socket 18. For all such standard types of lamp socket and lamps, the connection is made simply and without the use of special tools and not requiring e. g. soldering etc. In the presently preferred example, the lamp socket 18 is disposed to mount a lamp in a simple pin plug connection, i. e. the lamp socket 18 has two reception openings with electrical contact springs therein to receive pin-shaped electrical contacts of the lamp in a press fit connection. Other possible types of lamp socket 18 include plug connections where contact tabs are received in spring contact, or screw connections, bayonet connections etc.

The vehicle 10 shown in FIG. 1 comprises besides the OEM automotive lighting system an additional automotive lighting system 20 which has been retrofitted. The automotive lighting system 20 comprises headlamps 22 installed in the front of the vehicle 10. In the preferred embodiment the headlamps 22 are LED arrays, i. e. they comprise a plurality of LED elements.

The LED arrays of the headlamps 22 are connected to a DRL module 24 by wire connections 26. The DRL module 24 is connected to an electrical power supply 28, shown here as the battery of the vehicle 10.

In the vehicle 10 shown in FIG. 1, retrofitted with the automotive lighting system 20 including headlamps 22, a signal emitting device 30 is installed in the socket 18 of the position light 14 instead of a lamp. The signal emitting device 30 emits a coded radio signal if supplied with electrical power over the electrical contact of the lamp socket 18 connected to the electrical wiring 16.

Figure 2:
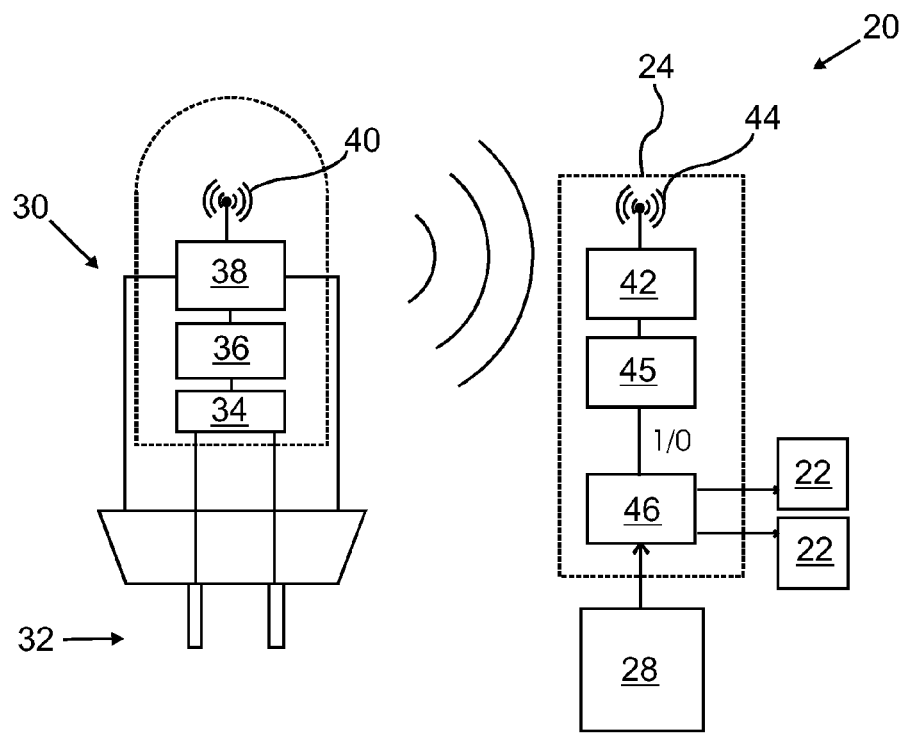
FIG. 2 shows a schematical representation of components of the lighting system of FIG. 1.

FIG. 2 shows components of the automotive lighting system 20 in a schematical representation. As shown, the signal emitting device 30 comprises a plug interface 32 comprising two parallel contact pins to be received in a correspondingly shaped lamp socket 18. However, while the plug connection interface 32 of the signal emitting device 30 is shaped equal to a standard lamp which would usually be installed in the position light 14, the signal emitting device 30 has no light source but only emits a radio signal.

In the schematic view of FIG. 2, details of the signal emitting device 30 are shown. The electrical interface 32 is connected to a voltage regulator 34 to provide a constant operating voltage. This allows to use the signal emitting device 30 with different onboard voltages.

The signal emitting device 30 further comprises an ID generator 36, which serves to generate a unique identifier. In the present example, the identifier is a binary number stored in the ID generator 36. The ID generator 36 comprises an encoder to encode the ID data in a signal.

Figure 4:
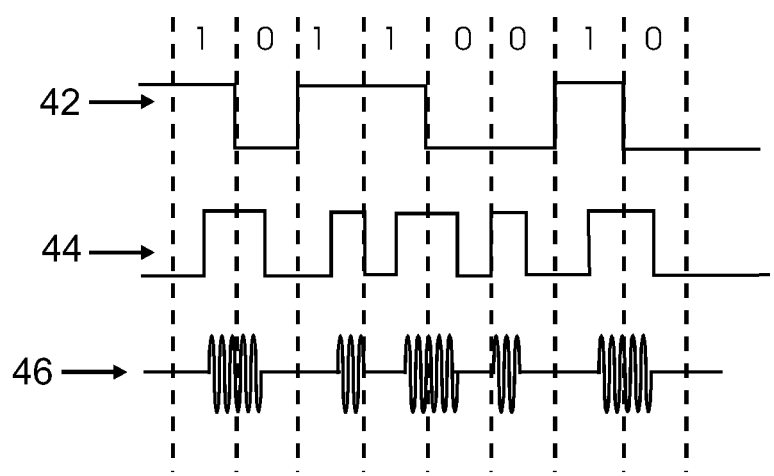
FIG. 4 shows a schematical representation of encoded signals.

FIG. 4 shows an example of such encoding. The ID data represented in binary form 42 is encoded using a Manchester code generated from a timing clock. The thus generated Manchester code 44 is then modulated by an ASK/FSK modulation to a modulated signal 46.

The modulated signal 46 is sent to a transmitter 38 to be distributed as a radio signal over an antenna 40.

The thus encoded modulated radio signal is received within the DRL module 24 by a receiver 42 connected to an antenna 44. The signal is de-modulated and decoded in the receiver 42. Decoding is effected reversely to the procedure shown in FIG. 4 to obtain the encoded ID data.

The decoded data stream is passed on to a controller 45 to compare the decoded ID data with pre-stored ID data. Controller 45 executes in parallel the two processes shown in FIGS. 3a, 3b.

Figure 3A:
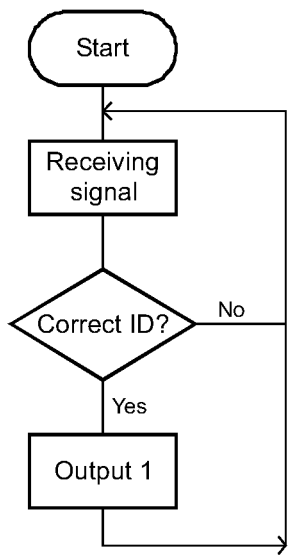
FIGS. 3a, 3b show flow charts of operation of a controller of the system of FIGS. 1, 2.

FIG. 3a shows a flow chart of a first operation of controller 45. The received decoded signal is compared with the pre-stored value for the ID data, which is identical to the ID data value pre-stored in ID generator 36 of signal emitting device 30. If the correct ID is received, an output signal of logical high (1) is generated.

Figure 3B:
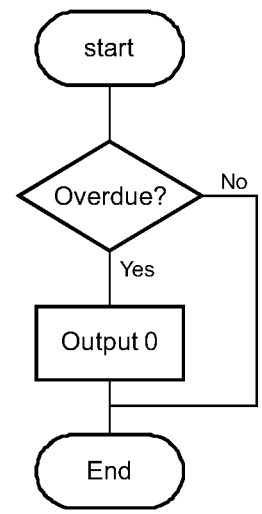

FIG. 3b illustrates in a flow chart a second process executed within controller 45. If no correct ID is received, the receiver checks if reception of a correct ID is overdue. This is the case if no correct ID has been received for a pre-set length of time. This length of time is intended to insure that the output signal remains stable even if for a very short period of time a correct signal is not received or recognized, e.g. due to temporary interferences. The length of time should be chosen long enough to avoid this, but still small enough to provide sufficiently quick switching. For example, the period of time until a correct ID is considered overdue could be from 100 ms to 10 s, preferably 1 s to 5 s. If the signal is indeed overdue, the output signal is set to logical low (0).

The binary output signal of controller 44, thus indicating whether an RF signal containing the correct ID if presently received or not, is supplied to a driver 46 which switches the electrical power supplied from the vehicle battery 28 to drive the light sources 22 accordingly.

Operation of the lighting system 20 is as follows:

If the ignition of the vehicle 10 is activated, the DRL module 24 is powered by the battery 28. The module 24 then operates the light sources 22 in two different modes, depending on reception of the the RF signal.

If at night the low beam of the vehicle 10 is activated, there will also be electrical power supplied to the position light 14. Since signal emitting device 30 is installed in the socket 18 of the position light 14, it will be supplied with electrical power over wiring 16 and socket 18. The signal emitting device 30 will thus operate to emit an RF signal including the encoded ID data.

As explained above, the DRL module 24 receives the RF signal and recognizes the encoded ID data. The output signal of controller 44 is therefore "1", indicating that a signal containing the correct ID data is currently received. Thus, driver 46 drives the light sources 22 in a first mode, where they are driven with low power to emit light of low luminous flux. In the case of LED arrays, the individual LEDs are driven with a pulse width modulated operating current with low duty cycle. The low intensity light of the light sources 22 thus replaces the lighting function of the position light 14 in this first mode.

If, on the other hand, the vehicle 10 is operated during the daytime with low beams turned off, the position light 14 will not be supplied with electrical power. The signal emitting device 30 will thus not operate. The DRL module 24 will detect no RF signal including the correct ID data. (Even in case that another vehicle including a similar system is present within RF range, or if a similar system is installed in other parts of the vehicle 10, any emitted RF signal will still not contain the unique ID data.) Controller 45 will therefore output a signal of "0", such that driver 46 drives the light sources 22 in a second mode.

In the second mode, the light sources 22 fulfill a DRL lighting function. They are consequently driven to emit higher luminous flux than in the first mode, i. e. may be driven with a higher duty cycle or even a continuous operating current.

Thus, in addition to the OEM lighting system of the vehicle 10, the additional automotive lighting system 20 provides a DRL lighting function in coordination with presently activated lighting function of the OEM automotive lighting system.

While the invention has been illustrated and described in detail in the drawings and foregoing description, such illustration and description are to be considered illustrative or exemplary and not restrictive; the invention is not limited to the disclosed embodiments.

In possible alternative embodiments, an additional automotive lighting system is provided not or not only for a position light/DRL lighting function, but may alternatively or in addition be provided for other lighting functions.

Other alternatives include different types of signaling besides a RF signal or signaling using different methods of encoding and/or modulation.

Also, besides LED arrays, different light sources 22 may be used and/or dimmed in ways different from using pulse width modulation with different duty cycle.

Further variations include that instead of providing an ID in the signal generated by ID generator 36 there may be a pre-stored unique code in each signal emitting device. For example, a MAC-address may be used as such a code. This pre-stored code is then used to code the signal. The same code is also stored in the module, so that a correct ID may be recognized.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. Automotive lighting system including
a signal emitting device to be installed in a lamp socket connected to a lighting connection of a vehicle, said signal emitting device emitting a radio signal depending on electrical power supplied to said lighting connection,
and a lighting module to be connected to an electrical power supply (28) of said vehicle, said lighting module comprising at least a receiver for said radio signal, and a control unit for controlling a vehicle front light source,
where said control unit is disposed to operate said vehicle front light source in a first mode if said radio signal is received in said receiver, and to operate said light source in a second mode if said radio signal is not received in said receiver.

2. Automotive lighting system according to claim 1, where said vehicle front light source is driven in said second mode to emit a higher luminous flux than in said first mode.

3. Automotive lighting system according to claim 2, where said vehicle front light source is driven in said first mode in a pulsed manner with a time average duty cycle lower than that in said second mode.

4. Automotive lighting system according to claim 1, where said signal is continuously emitted as long as electrical power is supplied to said lighting connection.

5. Automotive lighting system according to claim 1, where said signal emitting device is disposed to be installed in said socket instead of a lamp.

6. Automotive lighting system according to claim 4, where said signal emitting device is installed in a lamp socket of a position light of the vehicle, and said light source operating in said second mode is arranged at the front of said vehicle as a daytime running light.

7. Automotive lighting system according to claim 1, where said signal emitting device is releasably received in said lamp socket in a screw connection, bayonet connection or plug connection.

8. Automotive lighting system according to claim 1, where said signal emitting device comprises a signal generator for generating a coded signal;
and said receiver comprises a decoder for decoding said coded signal.

9. Signal emitting device for use in a system according to claim 1, said device comprising
a releasable electrical connection for fitting in electrical contacts of a vehicle lamp socket,
and a transmitter for emitting a signal if electrical power is supplied to said contacts.

10. Signal emitting device according to claim 9, where a voltage regulator is provided for regulating a voltage applied to said contacts.

11. Lighting module for use in a system according to claim 1, said lighting module comprising
a receiver for a radio signal,
a control unit,
and a light source disposed to be arranged as a front light of a vehicle,
where said control unit is disposed to drive said light source in a first mode if a predetermined radio signal is received in said receiver, and to drive said light source in a second mode if said signal is not received in said receiver.

12. Method of installing a light source in a vehicle, by
replacing a lamp received in a lamp socket connected to a lighting connection of a vehicle by a signal emitting device, said signal emitting device emitting a radio signal depending on electrical power supplied to said lighting connection,
installing and connecting to an electrical power supply of said vehicle a lighting module, disposed to operate a vehicle front light source in a first mode if said signal is received, and to operate said vehicle front light source in a second mode if said signal is not received.

* * * * *